(12) United States Patent
Shan et al.

(10) Patent No.: US 9,274,253 B2
(45) Date of Patent: Mar. 1, 2016

(54) PROCESS OF DRILLING ORGANIC GLASSES

(71) Applicant: Essilor International (Compagnie Generale d'Optique), Charenton-Le-Pont (FR)

(72) Inventors: Haifeng Shan, Shrewsbury, MA (US); Aref Jallouli, Shrewsbury, MA (US); Rick Muisener, Baskinf Ridge, NJ (US)

(73) Assignee: Essilor International (Compagnie Générale d'Optique), Charenton-le-Pont (FR)

( * ) Notice: Subject to any disclaimer, the term of this patent is extended or adjusted under 35 U.S.C. 154(b) by 76 days.

(21) Appl. No.: 13/899,802

(22) Filed: May 22, 2013

(65) Prior Publication Data

US 2014/0332154 A1      Nov. 13, 2014

Related U.S. Application Data

(60) Provisional application No. 61/820,816, filed on May 8, 2013.

(51) Int. Cl.
*B32B 38/04* (2006.01)
*B32B 17/00* (2006.01)
*G02C 7/02* (2006.01)
*G02B 1/04* (2006.01)
*B28D 1/14* (2006.01)
*B32B 27/08* (2006.01)
*G02C 13/00* (2006.01)
*B29D 11/00* (2006.01)
*B32B 17/10* (2006.01)
*B32B 38/00* (2006.01)

(52) U.S. Cl.
CPC ............. *G02B 1/041* (2013.01); *B28D 1/143* (2013.01); *B29D 11/00432* (2013.01); *B32B 27/08* (2013.01); *B32B 38/04* (2013.01); *G02B 1/043* (2013.01); *G02C 13/001* (2013.01); *B32B 17/1055* (2013.01); *B32B 38/0004* (2013.01); *G02C 7/02* (2013.01); *Y10T 156/1056* (2015.01); *Y10T 156/1057* (2015.01); *Y10T 156/12* (2015.01); *Y10T 428/31551* (2015.04)

(58) Field of Classification Search
CPC ............ B32B 17/1055; B32B 17/1077; B32B 17/10724; B32B 17/10807; B32B 17/1099; B32B 38/0004; B32B 38/04; B28D 1/143; G02C 7/02; G02C 13/001; C03B 22/074; C03B 22/02; Y10T 156/1056; Y10T 156/12
See application file for complete search history.

(56) References Cited

U.S. PATENT DOCUMENTS

| | | | |
|---|---|---|---|
| 4,643,936 A * | 2/1987 | Eidal | 428/214 |
| 7,135,545 B2 | 11/2006 | Yang et al. | |
| 7,726,808 B1 | 6/2010 | Kitchloo et al. | |
| 2004/0096666 A1 | 5/2004 | Knox et al. | |

FOREIGN PATENT DOCUMENTS

| | | | | |
|---|---|---|---|---|
| EP | 0522405 | | 1/1993 | |
| EP | 1 992 460 A2 * | 11/2008 | | B26F 1/26 |
| JP | 02009256113 A * | 11/2009 | | C03B 33/02 |
| WO | WO2012/108866 | | 8/2012 | |

OTHER PUBLICATIONS

Extended European Search Report, including the European search report and the European search opinion for EP Application No. 14166853.3, dated Aug. 14, 2014 (7 pages).

* cited by examiner

*Primary Examiner* — Linda L Gray
(74) *Attorney, Agent, or Firm* — Gardere Wynne Sewell LLP

(57) ABSTRACT

The present invention is drawn to a process of drilling organic glasses. The process comprises (a) providing an organic glass substrate; (b) providing onto at least one surface of said organic glass substrate optionally via an adhesive layer selected from the group consisting of pressure sensitive adhesives and hot melt adhesives, a polymer film having an elastic modulus of equal to or less than 3 GPa in at least one direction and a $E*h^2$ equal to or more than 3.5 N in at least one direction, E and h being respectively the elastic modulus and the thickness of the thermoplastic polymer film; and (c) drilling a hole through the organic glass substrate and polymer film by means of a drill.

16 Claims, No Drawings

PROCESS OF DRILLING ORGANIC GLASSES

CROSS REFERENCE TO RELATED APPLICATION

This application claims the benefit of U.S. Provisional Application No. 61/820,816 filed May 8, 2013. The contents of this application is incorporated herein by reference.

The present invention relates to a process of drilling that prevents damages on organic glasses, preferably organic ophthalmic lenses, in particular upon aggressive drilling conditions.

The manufacturing of rimless spectacles comprises the attachment of the temples part of the frame and the nose-bridge directly onto the ophthalmic lens. This generally requires drilling a through-hole in at least two points of the ophthalmic lenses in the peripheral region thereof. A common problem associated with rimless spectacles is the incidence of cracking and chipping in the lens during the drilling process, and the propagation of the cracks during the mounting of the temples part or nose-bridge and/or during the subsequent daily use of the spectacles.

One approach to reduce the incidence of cracking flaws associated with rimless spectacles is to employ lenses composed of selected materials having an increased resistance to such flaws as disclosed in U.S. Pat. No. 7,135,545.

U.S. Pat. No. 7,726,808 discloses polishing the borehole's side-wall with an abrasive wire so as to eliminate the microcracks and crazes, thereby preventing propagation thereof in the lens during mounting and use.

WO 2012/108866 discloses a process for drilling organic glasses by laminating onto the surface of the organic glass a thermoplastic film having an elastic modulus of more than 3 GPa. However, films with high elastic modulus are rigid and their deposition on a curved surface is difficult, as it requires specific processes implementing force and heating.

The purpose of the present invention is to provide a process of drilling that prevents damages on organic glasses while avoiding the above mentioned inconvenience. The present invention is based on the discovery that providing a polymer film having low elastic modulus onto the surface of the organic glass to be drilled can limit cracks and chipping during the drilling.

Therefore, the present invention relates to a process of drilling organic glasses, comprising the following steps:

(a) providing an organic glass substrate, preferably an ophthalmic lens substrate, (b) providing onto at least one surface of said organic glass substrate, optionally via an adhesive layer selected from the group consisting of pressure sensitive adhesives and hot melt adhesives, a polymer film having an elastic modulus of equal to or less than 3 GPa in at least one direction
and,
a $E^*h^2$ equal to or more than 3.5 N in at least one direction, E and h being respectively the elastic modulus and the thickness of the polymer film;
and
(c) drilling a hole through the substrate and the polymer film by means of a drill.

The Applicant found that the efficiency of the drilling process of the invention depends on both the elastic modulus and the thickness of the polymer film. With larger elastic modulus, smaller thickness is required, while with lower elastic modulus, larger thickness is required. What is essential in the method of the present invention is the presence of a polymer film having both a low elastic modulus and a high $E^*h^2$, during the drilling step. It is believed that the polymer film, and possibly also the adhesive, absorbs mechanical energy and thereby reduces or even prevents the formation of cracks and chips in the underlying organic glass substrate. Moreover, the polymer film according to the present invention having low elastic modulus in at least one direction can be applied easily onto the surface of the organic glass with soft processes.

It is not critical that the polymer film is permanently adhered to the substrate. In a preferred embodiment, the polymer film is temporarily adhered to the substrate and the method of the present invention further comprises, after the drilling step (c), a step (d) of removing the polymer film and optional adhesive from the substrate.

The chemical nature of the organic glass substrate provided in step (a) is not critical to the present invention as long as significant cracking and chipping problems are prone to happen when drilling through-holes in said substrates.

The organic glass may be thermoplastic or thermoset materials and may be selected from the group consisting of polycarbonates, polyurethanes, poly(thiourethanne), polyamides, polyimides, polysulfones, polycarbonate-ethylene terephthalate copolymers, polyolefines such as polynorbornenes, allyl diglycol carbonate homopolymers or copolymers, (meth)acrylic homopolymers and copolymers, thio(meth)acrylic homopolymers and copolymers, epoxy resins and episulfide resins. The organic glass substrate is preferably poly(thiourethane) substrates, more preferably poly(thiourethane) substrates having a refractive index of 1.74 which exhibit important drilling brittleness problems.

The organic glass may comprise on at least one surface or one side, functional layers thereon, such as abrasion resistant hard layers, impact resistant layers, anti-reflective layers, anti-fog topcoat layers, or anti-smudge topcoat layers.

In a preferred embodiment, the organic glass substrate is an optical lens, more preferably an ophthalmic lens, even more preferably a semi-finished or a finished ophthalmic lens having on at least one surface at least one functional layer as mentioned above, more preferably the finished ophthalmic lens is already edged to its final shape.

The method of the present invention is however not limited to lens drilling since the protective effect of the impact energy absorbing polymer film can be useful in a great number of applications whether in the field of optics or not.

In step (b), a polymer film is provided onto at least one surface of the organic glass substrate. Advantageously, the polymer film is provided onto both surfaces of the organic glass substrate. The polymer film may be adhered to the substrate surface(s) as is, with no adhesive on the film or the substrate, or via an adhesive layer. When no adhesive layer is used, the polymer film is maintained in place due to electrostatic forces. Preferably, the polymer film is provided on at least one surface of the substrate via an adhesive layer selected from the group consisting of pressure sensitive adhesives and hot melt adhesives.

The polymer film may be provided on the organic glass substrate by any suitable processes such as laminating. Due to the low elastic modulus of the polymer film according to the invention, soft processes not implementing specifically high force or heating can be used.

The polymer film may be provided onto the entire surface of the organic glass substrate. Alternatively, the polymer film may cover partially the surface of the substrate, in particular on the region of the substrate intended to be drilled.

When the organic glass comprises functional layers thereon, the polymer film is not provided directly onto the organic glass substrate but onto functional layers overlying said substrate.

The Applicant observed that a polymer film having a low elastic modulus can be used to prevent chipping. The elastic modulus of the polymer film is equal to or less than 3 GPa, preferably equal to or less than 2.5 GPa and typically comprised between 0.1 GPa and 2 GPa included, in at least one direction. Preferably in at least one direction, the elastic modulus is comprised between 0.01 GPa and 3 GPa included, more preferably between 0.1 and 2.5 GPa included, even more preferably between 1 and 2 GPa included.

In a preferred embodiment, the elastic modulus of the polymer film is equal to or less than 5 GPa, preferably equal to or less than 4 GPa, in all directions, on top of being equal to or less than 3 GPa, preferably equal to or less than 2.5 GPa in at least one direction.

Most preferably, the elastic modulus of the polymer film is equal to or less than 3 GPa in all directions, on top of being preferably equal to or less than 2.5 Gpa, or better, equal to or less than 2 GPa in at least one direction.

The Applicant has observed that the ability of the polymer film to prevent chipping, cracking or crazing during the drilling of the optical article is also related to the thickness of the polymer film. Beside an elastic modulus as defined above, the polymer film of the invention must have a $E*h^2$ equal to or more than 3.5 N, preferably equal to or more than 4 N, in at least one direction.

In a preferred embodiment, the polymer film of the invention has a $E*h^2$ equal to or more than 2 N, preferably equal to or more than 3 N, in all directions on top of being equal to or more than 4 N in at least one direction.

In a most preferred embodiment, the polymer film of the invention has a $E*h^2$ equal to or more than 3.5 N, preferably equal to or more than 4 N, in all directions.

In the present invention, when the elastic modulus and the $E*h^2$ of the polymer film are defined each in at least one direction, said directions are not necessarily the same. In other words, the criteria of the elastic modulus and the criteria of the $E*h^2$ can be satisfied in the same direction or in different directions. Preferably, the criteria of the elastic modulus and the criteria of the $E*h^2$ are satisfied in the same direction.

The elastic modulus is measured following the standard ASTM D882-12 with an Instron 3365 apparatus at a load of 5.0 kN and a crosshead speed of 5 mm/min on a sample cut in rectangle shape (100.0 mm×25.0 mm).

The thickness (h) is a mean value of the thickness of the polymer film without taking into account any thickness of a potential adhesive placed under the polymer film. The thickness (h) is measured by spectral reflectance using an apparatus F20-XT commercialized by Filmetrics.

The upper limit of the thickness of the polymer film is theoretically not limited. However, polymer films with large thickness might be not be practically acceptable since the substrate might be too thick for machining. The upper limit of the thickness of the polymer film of course is different for permanent and temporary polymer films. Temporary polymer films may be thicker than permanent ones. The thickness of the polymer film is typically comprised between 20 μm and 1 mm, preferably between 50 μm and 700 μm. For permanent polymer films, the thickness preferably does not exceed 700 μm and more preferably does not exceed 300 μm.

The polymer film is not particularly limited and may be any polymer film having both an elastic modulus and a $E*h^2$ as defined above. In particular, the polymer film may be a thermoset or UV curable material, polymerized before depositing the polymer film on the lens. Alternatively, the polymer film may be a polymer film made of thermoplastic polymers.

Preferred thermoset polymers that may be used for the present invention are selected from rubbers such as EPDM, silicone rubbers or natural rubbers.

Preferred thermoplastic polymers that may be used for the present invention are selected from the group consisting of polyurethane (PU), polyolefin such as polypropylene (PP), triacetate cellulose (TAC), poly(ethylene terephthalate) (PET), polyamide, polystyrene, poly(methyl methacrylate), polycarbonate, and cyclic olefin copolymer (COC). The polymer film may also be a multilayer film comprising two or more layers of a polymer, for example a polarising multilayer structure comprising a stretched polyvinyl alcohol layer between two outer TAC layers. In this case the overall film must have both a modulus and a $E*h^2$ as defined above.

When the polymer film is adhered only temporarily to the substrate and removed after drilling, the polymer film of course needs not to be transparent; it can be opaque, translucent or transparent.

When the polymer film is not meant to be removed after drilling, it is preferably transparent with a transmission of at least 80%, and preferably equal to or more than 90%. Furthermore, if the polymer film is not meant to be removed after drilling, it has preferably a haze value, measured by Hazeguard, of less than 0.2%, preferably equal to or less than 0.1%.

When an adhesive layer is used, it is selected from the group consisting of pressure sensitive adhesives and hot melt adhesives. Pressure sensitive adhesives are preferably used when the polymer film is temporarily adhered to the substrate while hot melt adhesives are preferably used when the polymer film is permanently adhered to the substrate.

By "pressure-sensitive adhesive" or "PSA" it is meant a dry contact adhesive, generally of viscoelastic nature, which only needs a very slight pressure to adhere to the surfaces it is between. PSAs are characterized by their ability to require no activation by water, solvent or heat to exert a strong adhesive holding force towards a surface. Pressure-sensitive adhesives are semi-solid adhesives, which form visco-elastic bonds that are aggressively and permanently tacky. They are available in solvent and latex based forms. The dry and unflowable PSA layers according to the invention may be formed by evenly applying a liquid form on either a geometrically defined surface of the lens substrate or on the polymer film. Thereafter, the deposited liquid latex layer is dried to an unflowable state by heating. Usually, heating will be performed at a temperature ranging from 40° C. to 130° C.

The final PSA layer has a low elastic modulus generally comprised between $10^3$ and $10^7$ Pa.

The typical PSA is acrylic-based, silicone-based, poly(vinyl pyrrolidone)-based or rubber-based PSA. They are preferably non-cross-linked.

Examples of rubber polymers, which can be used for formulating PSAs are elastomeric materials, such as polyvinyl ethers, polyurethanes, natural and synthetic polyisoprene, polyisobutylene, polybutylene, polybutadiene, polychloroprene (neoprene), styrene-butadiene copolymers, styrene-isoprene copolymers, styrene-isoprene-styrene (SIS) and styrene-butadiene-styrene (SBS) block copolymers, polyacrylonitrile, polytetrafluoroethylene, polyvinylchloride, poly(vinylidene chloride), polychlorodienes, and copolymers or mixtures thereof.

Examples of acrylic polymers, which can be used for formulating PSAs are poly(meth)acrylate acids and esters, such as isooctylacrylate/acrylic acid copolymers and mixtures thereof. Examples of silicone polymers, which can be used for formulating PSAs include polyorgano-siloxanes, those described in Sobieski et al., "Silicone Pressure-sensitive Adhesives," Handbook of Pressure-Sensitive Adhesive Technology, 2nd ed., pp. 508-517 (D. Satas, ed.), Van Nostrand Reinhold, New York (1989). Suitable silicone-based pressure-sensitive adhesives are commercially available. They can be produced through the hydrolysis and polymerization of silanes and siloxanes.

By "hot-melt adhesive" or "HMA", it is intended to mean a room temperature solid but flexible adhesive, which melts or drops in viscosity upon heating, and rapidly sets with cooling to create a bond. Most HMAs can be repeatedly softened by heat and hardened or set by cooling (thermoplastic HMAs), except for reactive HMAs, which are applied like conventional HMAs but form permanent, non melting bonds after cross-linking. Additives such as siloxanes or water can be used as cross-linking agent.

An important property of HMAs is their ability to solidify or "set" very rapidly under normal ambient conditions, preferably almost instantaneously, when cooling down from the application temperature. They are available in dry (solid) form and in liquid form (solvent based solution and water based latex). The HMA adhesive layer may be formed by evenly applying a liquid form either on the surface of the substrate or on the polymer film. The deposited liquid is then dried to an unflowable state by heating. Usually, heating will be performed at a temperature ranging from 40° C. to 130° C. When a dry form is used, it is heated to the temperature where it will melt and flow readily, and then it is applied to either the surface of the substrate or the polymer film. It can also be extruded into place by using a hot-melt extruder or die face.

Examples of polymers, which can be used for formulating HMAs are solvent-free polyamides, polyethylene, polypropylene and other olefin-type polymers, polyurethanes, poly (vinyl pyrrolidone), polyesters, poly(meth)acrylic systems, and copolymers or mixtures thereof. The hot-melt adhesives according to the invention are preferably selected from dry poly(meth)acrylic latexes, such as the acrylic latex commercialized under the name Acrylic latex A-639 by Zeneca, dry polyurethane latexes, such as the latexes commercialized under the names W-240 and W-234 by Baxenden, dry polyester latexes and mixtures thereof. Preferred latexes are polyurethane latexes. Other preferred latexes are core/shell latexes such as those described in U.S. Pat. No. 6,503,631 and especially latexes based on alkyl(meth)acrylates such as butyl acrylate or butyl methacrylate.

The thickness of the adhesive layer is preferably comprised in the range of 1 to 50 µm, more preferably of 10 to 30 µm.

When used, the adhesive layer may be applied either to the organic glass substrate or to the polymer film to be provided onto the substrate. In one embodiment of the method of the present invention, step (b) therefore comprises coating the polymer film with an adhesive layer and then applying and adhering the resulting adhesive film onto at least one surface of the substrate. In an alternative embodiment, step (b) comprises coating at least one surface of said substrate with an adhesive layer and applying and adhering onto said adhesive surface the polymer film.

In step (c), a hole is drilled through the substrate and the polymer film by means of a drill. When the polymer film is provided onto only one surface, the drill bit starts drilling from the opposite surface where the polymer film is provided, i.e. the drill drills through the substrate before drilling through the polymer film.

The Applicant observed that while organic glass substrates are generally not damaged by gentle drilling, aggressive drilling conditions can be detrimental to the substrate. By "aggressive drilling conditions", it is intended to mean a drilling speed of more than 2 mm/s, preferably more than 3 mm/s, with a drill size of more than 2 mm and preferably with no drilling peck.

When the polymer film is temporarily adhered to the substrate, the method of the present invention may comprise a step (d) of removing the polymer film and eventually the adhesive from the substrate. In such an embodiment, if an adhesive layer is used, it is preferably a PSA. When PSA is used, the polymer film can generally be removed by simply peeling it from the substrate and possibly cleaning the substrate to eliminate residual adhesive traces, if any.

The present invention also relates to an organic glass article, preferably an organic ophthalmic lens, comprising an organic glass substrate having a polymer film adhered onto at least one surface optionally via an adhesive layer selected from the group consisting of pressure sensitive adhesives and hot melt adhesives; said polymer film having an elastic modulus equal to or less than 3 GPa, preferably equal to or less than 2.5 GPa, in at least one direction and a $E*h^2$ equal to or more than 3.5 N, preferably equal to or more than 4 N, in at least one direction; E and h are respectively the elastic modulus and the thickness of the polymer film.

In said organic glass article, the organic glass substrate, the polymer film and the adhesive layer are as defined above.

Advantageously the organic glass article according to the present invention comprises a polymer film on both surfaces of the organic glass substrate.

In a preferred embodiment, the organic glass article as described herein is an ophthalmic lens comprising at least a functional layer preferably selected from the group consisting of abrasion resistant hard layers, impact resistant layers, anti-reflective layers, anti-fog topcoat layers, or anti-smudge topcoat layers.

The polymeric film may be adhered to the substrate surface(s) as is, with no adhesive on the film or the substrate, or via an adhesive layer. When no adhesive layer is used, the polymer film is maintained in place due to electrostatic forces. Preferably, the polymer film is adhered on at least one surface of the substrate via an adhesive layer selected from the group consisting of pressure sensitive adhesives and hot melt adhesives.

EXAMPLE

Aspheric lenses made of a polythiourethane resin having a refractive index of 1.74 with 2.50 base were used. These lenses were surfaced to plano (provide 0 dioptry of correction) and a thickness of 2 mm. They were treated with a standard anti-reflection stack including an ultra-hydrophobic surface treatment, and a pad control layer was deposited on top of it such as described in patent application EP1392613.

A pressure sensitive adhesive layer (CS9621, from Nitto Denko) with a thickness of 25.4 µm was laminated on polyurethane (PU) films from Bayer materials and polypropylene (PP) films from GRIFF Paper and Film.

The elastic modulus of the polymer films was measured in two directions of said polymer films according to the standard ASTM D882-12 on an Instron 3365 apparatus with the following conditions:

Load cell: 5.0 kN

Crosshead speed 5 mm/min

Data collection: 10 pst./sec.

A 25 mm×100 mm rectangle polymer film sample was placed between the grips with a distance between the grips of 30 mm. The polymer film was stretched until breaking and the elastic modulus was determined by the following formula:

$$\text{Modulus} = \frac{\text{Force}}{\text{Thickness} \times \text{Width}}.$$

The thickness of the polymer films was measured by spectral reflectance using an apparatus F20-XT from Filmetrics, as described above.

Table 1 below shows the characteristics of the polymer films.

TABLE 1

| Film | Thickness (μm) | Modulus (MPa) Direction - 1 | Modulus (MPa) Direction - 2 | $E*h^2$ (N) Direction - 1 | $E*h^2$ (N) Direction - 2 |
|---|---|---|---|---|---|
| PP1 | 25.4 | 1315 | 2814 | 0.9 | 1.8 |
| PP2 | 61 | 1273 | 2843 | 4.7 | 10.6 |
| PP3 | 76.2 | 1411 | 684 | 8.2 | 4.0 |
| PP4 | 101.6 | 566 | 535 | 5.8 | 5.5 |
| PP5 | 127 | 442 | 461 | 7.1 | 7.4 |
| PP6 | 228.6 | 660 | 615 | 34.5 | 32.1 |
| PU1 | 635 | 8 | 8 | 3.2 | 3.2 |
| PU2 | 1270 | 8 | 8 | 12.9 | 12.9 |

The polymer films were laminated manually on the temporal and nasal sites of the lenses prior to a drilling test.

Lenses with either a PU film or with a PP film on their convex side, concave side or both sides and lenses without any polymer film were drilled with a CNC optidrill apparatus with very aggressive conditions (drilling speed: 6 mm/s; drill bit: 2.2 mm; no drilling peck). The drilling position, size and shape were similar to common practice used by opticians in prescription laboratories. The concave side of each lens was laid upward and drilling was operated from the concave side of the lens to the convex side of the lens.

Table 2 below shows the results of the drilling test.

TABLE 2

| Test | Film | Results of the drilling test |
|---|---|---|
| 1 | — | Drilled side broken |
| 2 | PP1 - on convex side | No cracks - Serious chipping |
| 3 | PP2 - on convex side | No cracks - No chipping |
| 4 | PP5 - on convex side | No cracks - No chipping |
| 5 | PP6 - on convex side | No cracks - No chipping |
| 6 | PU1 - on convex side | No cracks - Small chipping |
| 7 | PU2 - on convex side | No cracks - No chipping |
| 8 | PP1 - on both sides | No cracks - Some chipping |
| 9 | PP2 - on both sides | No cracks - No chipping |
| 10 | PP3 - on both sides | No cracks - No chipping |
| 11 | PP4 - on both sides | No cracks - No chipping |
| 12 | PP5 - on both sides | No cracks - No chipping |
| 13 | PP6 - on both sides | No cracks - No chipping |
| 14 | PU1 - on both sides | No cracks - Small chipping |
| 15 | PU2 - on both sides | No cracks - No chipping |

The above results show that when the polymer films PP2, PP3, PP4, PP5, PP6 and PU2 having an elastic modulus of equal to or less than 3 GPa and a $E*h^2$ equal to or more than 3.5 N are provided either on one side/surface or both sides of a lens, the lens can be drilled without cracks or chipping defects at the drilled site, even in very aggressive drilling conditions (see test 3-5, 7, 9-13 and 15).

On the contrary, with the use of the polymer films PP1 and PU1, having a $E*h^2$ of less than 3.5 N, or without any polymer film, the lens is damaged (see test 1, 2, 6, 8 and 14).

The invention claimed is:

1. A process of drilling organic glasses, comprising the following steps:
   providing an organic glass substrate;
   providing onto at least one surface of said organic glass substrate a polymer film having:
   an elastic modulus of equal to or less than 3 GPa in at least one direction, and
   a $E*h^2$ equal to or more than 3.5 N in at least one direction, wherein E and h are respectively the elastic modulus and a thickness of the polymer film; and
   drilling a hole through the organic glass substrate and the polymer film by means of a drill.

2. The process according to claim 1, wherein the polymer film is adhered to the at least one surface of the organic glass substrate via an adhesive layer selected from the group consisting of pressure sensitive adhesives and hot melt adhesives.

3. The process according to claim 1, wherein the polymer film has the elastic modulus comprised between 0.1 GPa and 2.5 GPa included in the at least one direction.

4. The process according to claim 1, wherein the $E*h^2$ is equal to or more than 4 N in the at least one direction.

5. The process according to claim 1, wherein a polymer of the polymer film is a thermoplastic polymer selected from the group consisting of polyolefins, polyurethane, triacetate cellulose, poly(ethylene terephthalate), polyamide, polystyrene, poly(methyl methacrylate), polycarbonate and cyclic olefin copolymers.

6. The process according to claim 1, wherein the polymer film is transparent with a transmission equal to or more than 90% and a haze value equal to or less than 0.1%.

7. The process according to claim 1, wherein the organic glass substrate is an ophthalmic lens.

8. The process according to claim 7, wherein the ophthalmic lens is a semi-finished ophthalmic lens comprising on the at least one surface at least a functional layer preferably selected from the group consisting of an abrasion resistant hard layer, impact resistant layer, anti-reflective layer, anti-fog topcoat layer, and anti-smudge topcoat layer.

9. The process according to claim 1, wherein the thickness of the polymer film is between 20 μm and 1 mm.

10. The process according to claim 1, wherein the polymer film is provided on only one surface of the organic glass substrate and the drill drills through the organic glass substrate before drilling through the polymer film.

11. The process according to claim 1, wherein the polymer film is provided on both surfaces of the organic glass substrate.

12. The process according to claim 1, wherein the polymer film covers only partially the at least one surface of the organic glass substrate.

13. The process according to claim 1, wherein the polymer film covers an entire surface of the at least one surface of the organic glass substrate.

14. The process according to claim 1, further comprising coating an adhesive layer on at least a portion of the at least one surface of the organic glass substrate prior to providing the polymer film.

15. The process according to claim 1, further comprising coating an adhesive layer on at least a portion of the polymer film prior to providing the polymer film.

16. The process according to claim 1, further comprising removing the polymer film after drilling.

* * * * *